US011900848B2

(12) United States Patent
Chen et al.

(10) Patent No.: US 11,900,848 B2
(45) Date of Patent: Feb. 13, 2024

(54) COLOR GAMUT MAPPING METHOD, COLOR GAMUT MAPPING ASSEMBLY, AND DISPLAY DEVICE

(71) Applicant: SHENZHEN TCL DIGITAL TECHNOLOGY LTD., Shenzhen (CN)

(72) Inventors: Lin Chen, Shenzhen (CN); Daxue Xia, Shenzhen (CN); Renli Xie, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 17/996,729

(22) PCT Filed: Mar. 18, 2021

(86) PCT No.: PCT/CN2021/081599
§ 371 (c)(1),
(2) Date: Oct. 20, 2022

(87) PCT Pub. No.: WO2021/213091
PCT Pub. Date: Oct. 28, 2021

(65) Prior Publication Data
US 2023/0215321 A1 Jul. 6, 2023

(30) Foreign Application Priority Data
Apr. 20, 2020 (CN) ......................... 202010315496.7

(51) Int. Cl.
*G09G 3/20* (2006.01)

(52) U.S. Cl.
CPC ... *G09G 3/2003* (2013.01); *G09G 2320/0666* (2013.01); *G09G 2340/06* (2013.01)

(58) Field of Classification Search
CPC ............. G09G 3/2003; G09G 2340/06; G09G 2320/0666
See application file for complete search history.

(56) References Cited

U.S. PATENT DOCUMENTS

2006/0170939 A1* 8/2006 Misumi ................ H04N 1/6058 358/1.9
2018/0352263 A1* 12/2018 Francois .............. H04N 19/186

FOREIGN PATENT DOCUMENTS

CN 107863081 A 3/2018
CN 107888893 A 4/2018
(Continued)

OTHER PUBLICATIONS

Written Opinion of the International Search Authority in international application No. PCT/CN2021/081599, dated Jun. 28, 2021.
(Continued)

*Primary Examiner* — Lisa S Landis
(74) *Attorney, Agent, or Firm* — PV IP PC; Wei Te Chung; Zhigang Ma

(57) ABSTRACT

Disclosed in the present application are a color gamut mapping method, a color gamut mapping assembly, and a display device. The method includes: obtaining a first connection line between a white point and an original point of the original color gamut; obtaining a first mapping point in a target color gamut of an intersection point of the first connection line and the original color gamut; obtaining a second connection line between a reference point in the original color gamut and the first mapping point; obtaining color coordinates of a second mapping point of the original point in the target color gamut; obtaining a luminance value of the second mapping point according to the original point and the white point; and obtaining grayscale values of the second mapping point according to the color coordinates and the luminance value of the second mapping point.

20 Claims, 5 Drawing Sheets

(56) References Cited

FOREIGN PATENT DOCUMENTS

| | | | | |
|---|---|---|---|---|
| CN | 110675797 | A | | 1/2020 |
| CN | 111341283 | A | | 6/2020 |
| CN | 110675797 | | * | 10/2020 |
| EP | 3624433 | A1 | | 3/2020 |

OTHER PUBLICATIONS

International Search Report in International application No. PCT/CN2021/081599, dated Jun. 28, 2021.

* cited by examiner

COLOR GAMUT MAPPING METHOD, COLOR GAMUT MAPPING ASSEMBLY, AND DISPLAY DEVICE

CROSS-REFERENCE TO RELATED APPLICATION

This application is a US national phase application based upon an International Application No. PCT/CN2021/081599, filed on Mar. 18, 2021, which claims priority to Chinese Patent Application No. 202010315496.7, titled “COLOR GAMUT MAPPING METHOD, COLOR GAMUT MAPPING ASSEMBLY, AND DISPLAY DEVICE”, filed on Apr. 20, 2020, the disclosure of which is incorporated by reference in the present application in its entirety.

FIELD OF DISCLOSURE

The present disclosure relates to a field of display technology, and more specifically, to a color gamut mapping method, a color gamut mapping assembly, and a display device.

BACKGROUND

A display needs to be adjusted and calibrated for color performance during a production process in order to make the display present a target color or a standard color and bring a better viewing experience to users. In the related art, it mainly relies on experienced professionals to manually adjust a color performance of the display, and there is subjective bias that makes it difficult to achieve consistency in color adjustment.

The aforementioned assists in understanding technical solutions of the present application, and does not necessarily admit that the aforementioned constitutes the prior art.

SUMMARY

Technical Problem

The main purpose of embodiments of the present application is to provide a color gamut mapping method, which aims to solve a technical problem of the prior art of relying on experienced professionals to manually adjust color performance of a display, which has subjective bias and makes it difficult to achieve consistency in color adjustment.

Technical Solutions

To solve the above problems, embodiments of the present application provide a color gamut mapping method, the method comprises the following:

- obtaining a first connection line between a white point of an original color gamut and an original point of the original color gamut;
- obtaining a first mapping point in a target color gamut of an intersection point of the first connection line and the original color gamut;
- obtaining a second connection line between a reference point in the original color gamut and the first mapping point;
- obtaining color coordinates of a second mapping point of the original point in the target color gamut according to the white point, the reference point, the original point, the intersection point, and the second connection line;

- obtaining a luminance value of the second mapping point according to the original point and the white point; and
- obtaining grayscale values of the second mapping point according to the color coordinates and the luminance value of the second mapping point.

In an embodiment, the step of obtaining color coordinates of the second mapping point of the original point in the target color gamut according to the white point, the reference point, the original point, the intersection point, and the second connection line comprises:

- obtaining a first distance from the reference point to the original point if the original point is not between the white point and the reference point;
- obtaining a second distance from the reference point to the intersection point;
- obtaining a first ratio of the first distance to the second distance;
- obtaining the color coordinates of the second mapping point based on the first ratio and the second connection line;
- determining that the color coordinates of the second mapping point are the color coordinates of the original point if the original point is between the white point and the reference point.

In an embodiment, the step of obtaining the color coordinates of the second mapping point based on the first ratio and the second connection line, comprises:

- obtaining the color coordinates of the second mapping point through equal-proportional mapping according to the first ratio and the second connection line.

In an embodiment, the step of obtaining the color coordinates of the second mapping point based on the first ratio and the second connection line, comprises:

- obtaining a degree of aggregation based on the first ratio;
- obtaining a position of the second mapping point on the second connection line according to the degree of aggregation;
- obtaining the color coordinates of the second mapping point according to the position of the second mapping point on the second connection line, wherein the second connection line is a distribution curve.

In an embodiment, the step of obtaining the first mapping point in the target color gamut of the intersection point of the first connection line and the original color gamut comprises:

- obtaining an intersection point of the first connection line intersecting the original color gamut;
- obtaining a position of the intersection point on a boundary line of the original color gamut;
- obtaining a boundary line of the target color gamut corresponding to the boundary line of the original color gamut at the intersection point;
- obtaining the first mapping point based on the position of the intersection point on the boundary line of the original color gamut and the boundary line of the target color gamut.

In an embodiment, the second connection line is a curve, the second connection line is tangent to the first connection line, and the second connection line is tangent to the boundary line of the target color gamut.

In an embodiment, the second connection line is an arc curve.

In an embodiment, the color gamut mapping method further comprises:

- obtaining the reference point based on the white point and the intersection point.

In an embodiment, the step of obtaining the reference point based on the white point and the intersection point comprises:

obtaining a third distance from the white point to the intersection point;

obtaining the reference point based on a preset ratio, the third distance, and the white point.

In an embodiment, the preset ratio is greater than or equal to 0 and less than or equal to 1, wherein the preset ratio is equal to a ratio of a distance from the reference point to the white point to a distance from the white point to the intersection point.

In an embodiment, the step of obtaining the luminance value of the second mapping point according to the original point and the white point comprises:

obtaining a first maximum luminance value of the white point in the original color gamut and a second maximum luminance value of the white point in the target color gamut;

obtaining a luminance value of the second mapping point based on a luminance value of the original point, the first maximum luminance value, and the second maximum luminance value.

In an embodiment, the step of obtaining the luminance value of the second mapping point based on the luminance value of the original point, the first maximum luminance value, and the second maximum luminance value comprises:

obtaining a second ratio of the luminance value of the original point to the first maximum luminance value;

obtaining the luminance value of the second mapping point based on the second ratio and the second maximum luminance value.

In an embodiment, the reference point is a non-fixed point or a plurality of non-fixed points preset in the original color gamut.

In an embodiment, the white point of the original color gamut is located at a same position in the color coordinates as the white point of the target color gamut.

In an embodiment, after the step of determining that the color coordinates of the second mapping point are the color coordinates of the original point if the original point is between the white point and the reference point, the color gamut mapping method further comprises:

adjusting the color coordinates of the second mapping point according to the luminance value of the second mapping point, so that an actual luminance value of the second mapping point is consistent with the calculated luminance value of the second mapping point.

In an embodiment, the step of obtaining grayscale values of the second mapping point according to the color coordinates and the luminance value of the second mapping point comprises:

calculating tri-stimulus values of the second mapping point based on the color coordinates and the luminance value of the second mapping point and an electro-optical conversion curve;

converting the tri-stimulus values of the second mapping point into corresponding grayscale values.

In an embodiment, the step of obtaining the gray scale values of the second mapping point according to the color coordinates and the luminance value of the second mapping point comprises:

calculating the grayscale values of a plurality of mapping points in a color gamut triangle corresponding to the original color gamut by selecting R, G, and B (red, green, and blue) of the original color gamut at different gray scales, respectively, to establish a mapping lookup table from the original color gamut to the target color gamut;

obtaining the grayscale values of the second mapping point in the target color gamut according to the grayscale values of the original point in the original color gamut and the mapping lookup table.

Further, to solve the above problems, embodiments of the present application provide a color gamut mapping assembly, the color gamut mapping assembly comprises a processor, a memory, and a color gamut mapping program that is stored in the memory and runs on the processor, the color gamut mapping program when executed by the processor implementing the steps of the color gamut mapping method as described above.

Embodiments of the present application further provide a display device, the display device comprises a processor, a memory, and a color gamut mapping program that is stored in the memory and runs on the processor, the color gamut mapping program when executed by the processor implementing the steps of the color gamut mapping method as described above.

Embodiments of the present application further provide a computer-readable storage medium, the computer-readable storage medium having a color gamut mapping program stored thereon, the color gamut mapping program when executed by the processor implementing the steps of the color gamut mapping method as described above.

Advantages of the Present Disclosure

Embodiments of the present application proposes a color gamut mapping method. By means of the original point, the reference point, the intersection point, the white point and the second connection line, the second mapping point of the original point in the target color gamut are obtained, and by means of in-situ mapping or linear mapping of part of the original point in the original color gamut, the second mapping point in the target color gamut is obtained, and by means of non-linear mapping of part of the original point in the original gamut according to the second connection line, the second mapping point in the target color gamut is obtained. By automatically adjusting performance of the color points of the original gamut in the target color gamut, no manual adjustment by professionals is required, so as to avoid subjective bias and achieve beneficial effect of consistency in color adjustment, while the non-linear mapping enables a smooth transition from the original point to the second mapping point, so that the color points in the original color gamut are displayed more naturally in the target color gamut, which can effectively avoid color distortion and unnaturalness.

The implementation, functional features and advantages of the present application will be further described with reference to the accompanying drawings in combination with embodiments.

DETAILED DESCRIPTION

It should be understood that the specific embodiments described herein are merely intended to explain the present application, rather than to limit the present application.

The main solution of the present application is: to obtain a first connection line between a white point of an original color gamut and an original point of the original color gamut; to obtain a first mapping point in a target color gamut of an intersection point of the first connection line and the original color gamut; to obtain a second connection line between a reference point in the original color gamut and the first mapping point; to obtain color coordinates of a second mapping point of the original point in the target color gamut according to the white point, the reference point, the original point, the intersection point, and the second connection line; to obtain a luminance value of the second mapping point according to the original point and the white point; and to obtain grayscale values of the second mapping point according to the color coordinates and the luminance value of the second mapping point.

Since a color performance of a display is manually adjusted by experienced professionals in the prior art, there is subjective bias that makes it difficult to achieve consistency in color adjustment.

Embodiments of the present application provide a color gamut mapping method. The second mapping point of the original point in the target color gamut is obtained by the original point, the reference point, the intersection point, the white point, and the second connection line, and the second mapping point in the target color gamut is obtained by in-situ mapping or linear mapping of part of the original point in the original color gamut, and the second mapping point in the target color gamut is obtained by non-linear mapping of the part of the original point in the original color gamut according to the second connection line. By automatically adjusting performance of color points of the original gamut in the target color gamut, no manual adjustment by professionals is required, so as to avoid subjective bias and achieve beneficial effect of consistency in color adjustment, while the non-linear mapping enables a smooth transition from the original point to the second mapping point, so that the color points in the original color gamut are displayed more naturally in the target color gamut, which can effectively avoid color distortion and unnaturalness.

Figure 1:
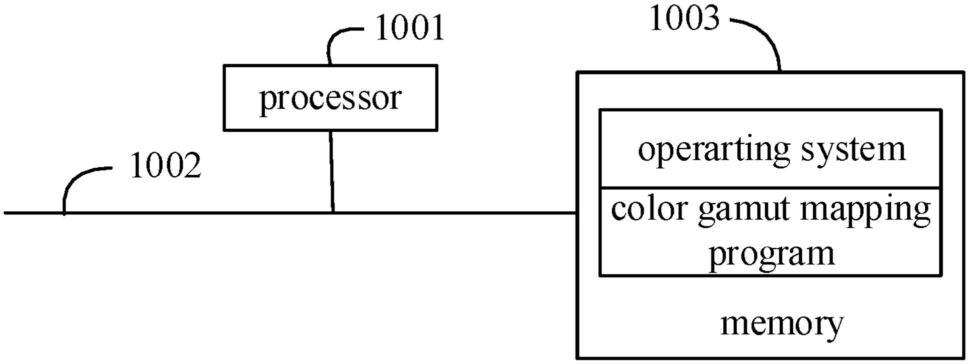
FIG. 1 is a schematic structural diagram of a terminal of a hardware operating environment involved in a solution according to an embodiment of the present application.

As shown in FIG. 1, FIG. 1 is a schematic structural diagram of a terminal of a hardware operating environment involved in a solution according to an embodiment of the present application.

The terminal of the present application may be a display device or a color gamut mapping assembly. The display device may be a display apparatus such as a television, a computer, or a display. It should be noted that the display device includes the color gamut mapping assembly.

As shown in FIG. 1, the display device may comprise: a processor 1001, such as a central processing unit (CPU), a communication bus 1002, and a memory 1003. Wherein the communication bus 1002 is configured to enable communication of connections between these components. The memory 1003 may be a high-speed random-access memory (RAM) memory or a stable memory (non-volatile memory) such as a disk memory. The memory 1003 may also be a storage device independent of the aforementioned processor 1001 in one embodiment.

It should be understood by those skilled in the art that the terminal structure illustrated in FIG. 1 does not constitute a limitation of the terminal and may comprise more or fewer components than illustrated, or a combination of certain components, or a different arrangement of components.

As shown in FIG. 1, the memory 1003 as a computer storage medium may comprise an operating system as well as a color gamut mapping program, and the processor 1001 may be used to call the color gamut mapping program stored in the memory 1003 and perform following steps:

obtaining a first connection line between a white point of an original color gamut and an original point of the original color gamut;

obtaining a first mapping point in a target color gamut of an intersection point of the first connection line and the original color gamut;

obtaining a second connection line between a reference point in the original color gamut and the first mapping point;

obtaining color coordinates of a second mapping point of the original point in the target color gamut according to the white point, the reference point, the original point, the intersection point, and the second connection line;

obtaining a luminance value of the second mapping point according to the original point and the white point; and obtaining grayscale values of the second mapping point according to the color coordinates and the luminance value of the second mapping point.

Further, the processor 1001 may be used to call the color gamut mapping program stored in the memory 1003 and perform steps of:

obtaining a first distance from the reference point to the original point if the original point is not between the white point and the reference point;

obtaining a second distance from the reference point to the intersection point;

obtaining a first ratio of the first distance to the second distance;

obtaining the color coordinates of the second mapping point based on the first ratio and the second connection line;

determining that the color coordinates of the second mapping point are the color coordinates of the original point if the original point is between the white point and the reference point.

Further, the processor 1001 may be used to call the color gamut mapping program stored in the memory 1003 and perform steps of:

obtaining an intersection point of the first connection line intersecting the original color gamut;

obtaining a position of the intersection point on a boundary line of the original color gamut;

obtaining a boundary line of the target color gamut corresponding to the boundary line of the original color gamut at the intersection point;

obtaining the first mapping point based on the position of the intersection point on the boundary line of the original color gamut and the boundary line of the target color gamut.

Further, the processor 1001 may be used to call the color gamut mapping program stored in the memory 1003 and perform steps of:

obtaining the reference point based on the white point and the intersection point.

Further, the processor 1001 may be used to call the color gamut mapping program stored in the memory 1003 and perform steps of:

obtaining a third distance from the white point to the intersection point;

obtaining the reference point based on a preset ratio, the third distance, and the white point.

Further, the processor 1001 may be used to call the color gamut mapping program stored in the memory 1003 and perform steps of:

obtaining a first maximum luminance value of the white point in the original color gamut and a second maximum luminance value of the white point in the target color gamut;

obtaining a luminance value of the second mapping point based on a luminance value of the original point, the first maximum luminance value, and the second maximum luminance value.

Further, the processor 1001 may be used to call the color gamut mapping program stored in the memory 1003 and perform steps of:

obtaining a second ratio of the luminance value of the original point to the first maximum luminance value;

obtaining the luminance value of the second mapping point based on the second ratio and the second maximum luminance value.

Figure 2:
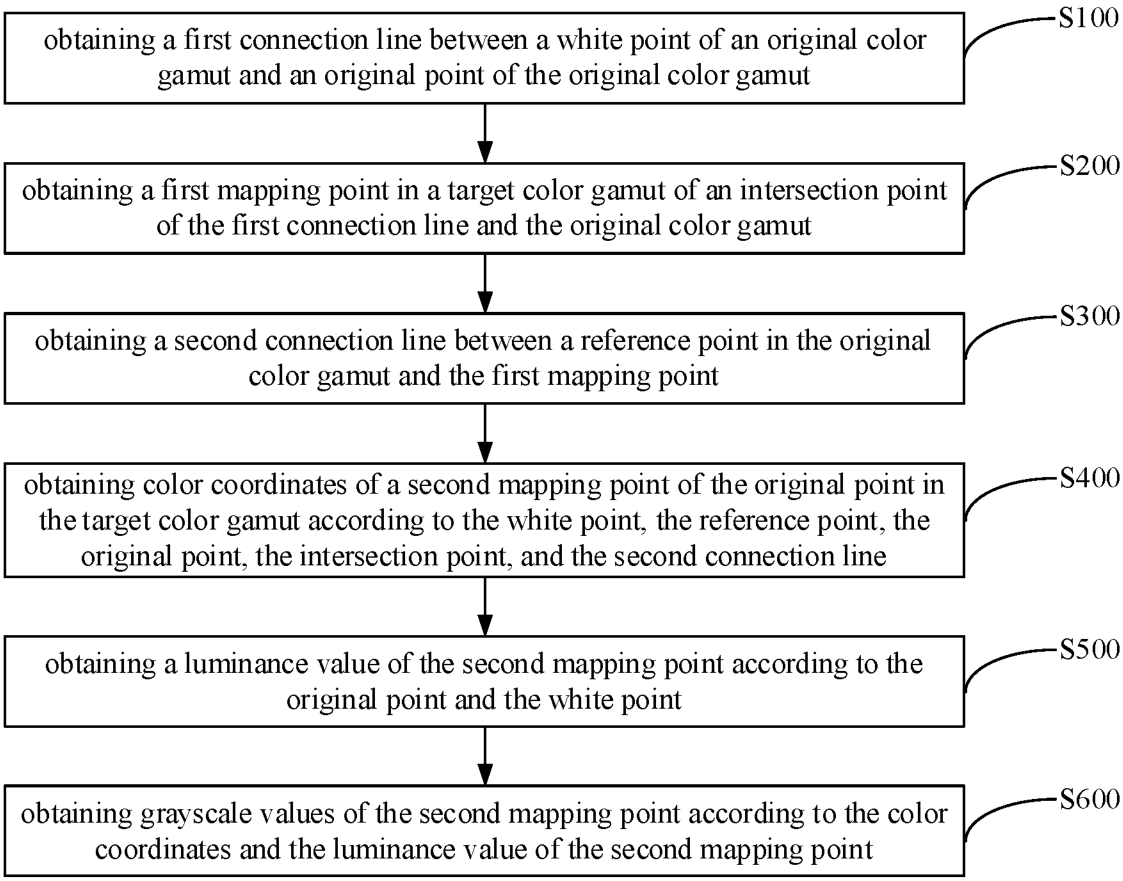
FIG. 2 is a schematic flowchart of a first embodiment of a color gamut mapping method of the present application.

Based on the structure of the terminal described above, a first embodiment of the present application is provided, with reference to FIG. 2. FIG. 2 shows a schematic flowchart of a first embodiment of a color gamut mapping method of the present application, the color gamut mapping method comprises steps of:

step S100: obtaining a first connection line between a white point of an original color gamut and an original point of the original color gamut;

step S200: obtaining a first mapping point in a target color gamut of an intersection point of the first connection line and the original color gamut.

In this embodiment, the executing object may be a color gamut mapping assembly or a display device, such as a monitor, a television, and a computer, which is denoted by a display terminal in the following description.

With the development of display technology, variety of colors that can be expressed by display terminals is increasing, and a corresponding color gamut range is also increasing, but the color variety of color gamut of image sources is relatively small, and the color gamut range is relatively narrow, so it is necessary to map the color gamut of the image sources in order to make full use of color expression capability of the display terminals. In addition, the color gamut in the display can also be mapped between different displays, as the color expression capability of different kinds of displays is different, and thus display capability of the display can be fully utilized.

The original color gamut can be the color gamut of the image sources, such as BT.709, BT.2020, or a higher color gamut containing more colors, or a lower color gamut containing fewer colors, it is not limited here. The target color gamut can be a corresponding color gamut of the display, either a high color gamut containing more colors or a low color gamut containing fewer colors.

Figure 3:
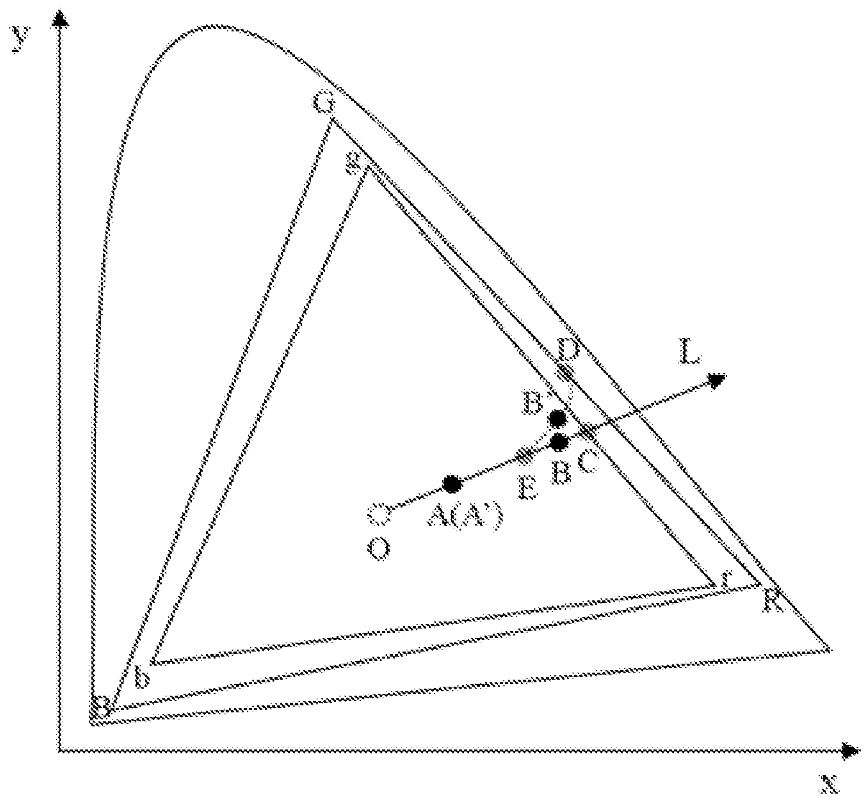
FIG. 3 is a schematic diagram of a color gamut mapping involved in an embodiment of the present application.

The original color gamut and the target color gamut may have three base colors (e.g., R, G, and B) or a gamut with more base colors (e.g., R, G, B, Y, C, and M), and for ease of understanding, the gamut formed by the three base colors R, G, and B is taken as an example. Referring to FIG. 3, the original color gamut is represented by rgb, the target color gamut is represented by RGB, and a tongue diagram is a chromaticity diagram, wherein the chromaticity diagram can be either CIE1931 or CIE 1976.

The white point of the original color gamut is a white light point formed by mixing red, green, and blue with a same light energy, and is a point with the highest luminance value of the original color gamut, i.e., a point corresponding to grayscale values of (255, 255, 255). Referring to FIG. 3, a position of the white point shown in FIG. 3 is point O. The color coordinates and luminance value can be obtained by the grayscale values of the white point.

The original point can be any color point in the original color gamut and is a color point that needs to be mapped to the target color gamut and may be expressed in terms of grayscale values. The display terminal can obtain corresponding color coordinates and luminance values based on the grayscale values of the original point.

In one embodiment, the display terminal obtains tri-stimulus values (expressed as X, Y, and Z) of the original point from a photoelectric conversion curve, calculates the color coordinates of the original point from the tri-stimulus values, and calculates the luminance value of the original point from the Y value of the tri-stimulus values.

The mapping point is a corresponding color point of the original point in the target color gamut, either one-to-one, or many-to-one.

The first connection line between the white point and the original point in the original color gamut is obtained, wherein the first connection line may be a ray from the white point to the original point, starting from the white point. Referring to FIG. 3, the original point may be points A or B, and the first connection line is a ray where OA is located.

The first connection line intersects the original color gamut at the intersection point. Referring to FIG. 3, the first connection line OA intersects a boundary line gr of the original color gamut at point C.

The first mapping point of the intersection point in the target color gamut is located on the boundary line of the target color gamut. Referring to FIG. 3, the first mapping point of the intersection point C in the target color gamut is point D.

Step S300: obtaining a second connection line between a reference point in the original color gamut and the first mapping point.

Figure 4:
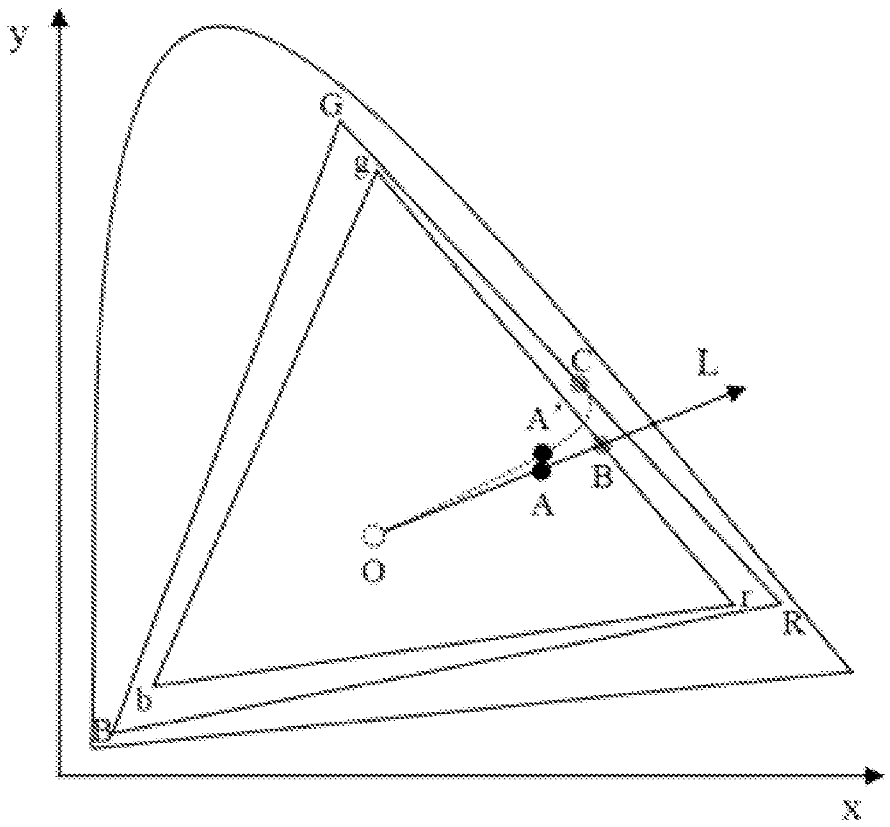
FIG. 4 is a schematic diagram of another color gamut mapping involved in an embodiment of the present application.

The reference point may be a point, or a series of points set by a designer in the original color gamut as required for use as a standard for mapping the original point. It should be noted that the reference point may not be a fixed point and may be adjusted in an orderly manner according to changes in the color coordinates of the original point. Referring to FIG. 3, the reference point may be any point on the line segment OC, such as point E, and may also include points 0 and C. Referring to FIG. 4, the reference point is at the white point 0, forming a second connection line OC.

The second connection line is obtained between the reference point and the mapping point, wherein the second connection line may be a straight line or a curve. Referring to FIG. 3, the second connection line may be ED.

The second connection line is a mapping connection line, and a position of the second mapping point of the original point in the target color gamut can be obtained correspondingly according to a position of the original point between the reference point and the intersection point.

As an optional implementation manner, the second connection line is the curve. The second connection line is tangent to the first connection line, and the second connection line is tangent to the boundary line of the target color gamut.

The second connection line is the curve. The second connection line is tangent to the first connection line with a tangent point being the reference point, and the second connection line is tangent to the boundary line of the target color gamut with a tangent point being the first mapping point. The second connection line is a smooth arc, which can achieve a smooth transition of the color mapping, avoid color hopping, and make the color performance in the target color gamut natural and uniform.

Step S400: obtaining color coordinates of a second mapping point of the original point in the target color gamut according to the white point, the reference point, the original point, the intersection point, and the second connection line.

The display terminal can obtain the color coordinates of the second mapping point of the original point in the target color gamut based on a relative position of the original point to the white point, the reference point, and the intersection point, in combination with the second connection line. Referring to FIG. 3, the second mapping point corresponding to point A is A' and the second mapping point corresponding to point B is B'.

Step S500: obtaining a luminance value of the second mapping point according to the original point and the white point.

The display terminal can obtain the luminance value of the original point based on the grayscale values of the original point, and following a principle that relative luminance value remains unchanged before and after mapping, and can obtain the luminance value of the second mapping point based on the luminance value of the original point, the luminance value of the white point in the original color gamut, and the luminance value of the white point in the target color gamut.

In an embodiment, the white point in the original color gamut is located at a same position in the color coordinates as the white point in the target color gamut.

In an embodiment, during mapping of the original color gamut to the target color gamut, the luminance value at the color coordinates of the second mapping point is different from a calculated luminance value, and in order to reduce the color distortion caused by a change of the luminance value, the display terminal may adjust the color coordinates of the second mapping point according to the luminance value of the second mapping point, so that an actual luminance value of the second mapping point is consistent with the calculated luminance value of the second mapping point.

Figure 5:
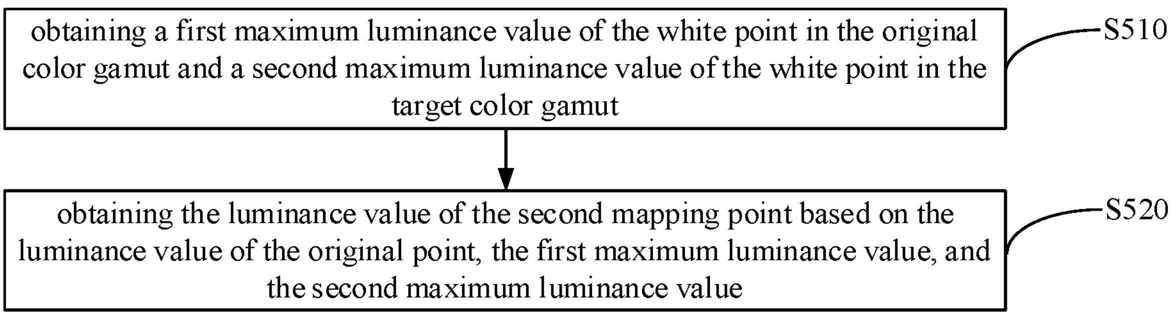
FIG. 5 is a detailed flowchart of step S500 in FIG. 2.

As an optional implementation manner, with reference to FIG. 5, FIG. 5 shows a detailed flowchart of step S500 in FIG. 2. The step S500 comprises:

step S510: obtaining a first maximum luminance value of the white point in the original color gamut and a second maximum luminance value of the white point in the target color gamut;

step S520: obtaining the luminance value of the second mapping point based on the luminance value of the original point, the first maximum luminance value, and the second maximum luminance value.

The luminance value may be normalized. The first maximum luminance value of the white point in the original color gamut may be 1, but the second maximum luminance value of the white point in the target color gamut is different from the first maximum luminance value. This is because the white point is the point with the highest luminance value in the original color gamut, while the white point is not the point with the highest luminance value in the target color gamut.

The display terminal may calculate the luminance value of the second mapping point based on the luminance value of the original point, the first maximum luminance value, and the second maximum luminance value.

Figure 6:
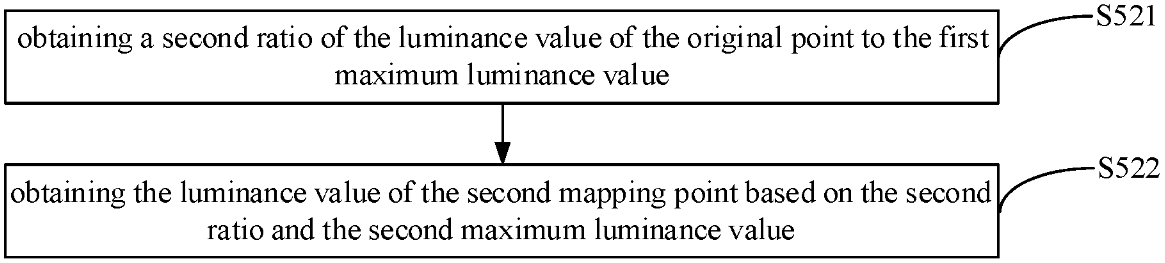
FIG. 6 is a detailed flowchart of step S520 in FIG. 5.

As an optional implementation manner, with reference to FIG. 6, FIG. 6 shows a detailed flowchart of step S520 in FIG. 5, the step S520 comprises:

step S521: obtaining a second ratio of the luminance value of the original point to the first maximum luminance value;

step S522: obtaining the luminance value of the second mapping point based on the second ratio and the second maximum luminance value.

The ratio of the luminance value of the original point to the first maximum luminance value is the second ratio. The luminance value of the second mapping point is equal to the product of the second ratio and the second maximum luminance value according to the principle that the relative luminance value remains unchanged before and after mapping. The luminance value of the original point, the first maximum luminance value, the second maximum luminance value, and the luminance value of the second mapping point satisfy the following equation:

$$\frac{L_1}{Lw_1} = \frac{L_2}{Lw_2},$$

wherein L1 is the luminance value of the original point; L2 is the luminance value of the second mapping point; Lw1 is the first maximum luminance value; and Lw2 is the second maximum luminance value.

Step S600, obtaining grayscale values of the second mapping point according to the color coordinates and the luminance value of the second mapping point.

After obtaining the color coordinates and luminance value of the second mapping point, tri-stimulus values of the second mapping point can be calculated based on the color coordinates and the luminance value of the mapping point and electro-optical conversion curve, and then the tri-stimulus values of the second mapping point are converted into corresponding grayscale values, so as to obtain the grayscale values of the second mapping point in the target color gamut and realize the mapping of the original point in the target color gamut.

In an embodiment, the display terminal may also calculate grayscale values of 729 (i.e., 9*9*9) mapping points in a color gamut triangle corresponding to the original color gamut by selecting R, G, and B at grayscales of 0/32/64/96/128/160/192/224/255, respectively, to establish a mapping lookup table from the original color gamut to the target color gamut. In one embodiment, a mapping lookup table of 4913 (i.e., 17*17*17) pixel points can also be established. In this way, the grayscale values of the mapping point in the target color gamut can be obtained by means of a lookup based on the grayscale values of the original point in the original color gamut, thus reducing the complexity of calculation process. When the grayscale values of the original point is not in the table, the grayscale values of the mapping point can be obtained by an interpolation calculation method. It should be noted that the interpolation calculation method includes, but is not limited to, linear interpolation, cubic interpolation, polynomial interpolation, and nearest neighbor interpolation.

In this embodiment, the second mapping point of the original point in the target color gamut is obtained according to the original point, the reference point, the intersection point, the white point, and the second connection line. The second mapping point in the target color gamut is obtained by in-situ mapping or linear mapping of the part of the original point in the original color gamut, and the second mapping point in the target color gamut is obtained by non-linear mapping of the part of the original point in the original color gamut according to the second connection line. By automatically adjusting performance of the color points of the original gamut in the target gamut, no manual adjustment by professionals is required, so as to avoid subjective bias and achieve beneficial effect of consistency in color adjustment, while the non-linear mapping enables the smooth transition from the original point to the second mapping point, so that the color points in the original gamut are displayed more naturally in the target gamut, which can effectively avoid color distortion and unnaturalness.

Figure 7:
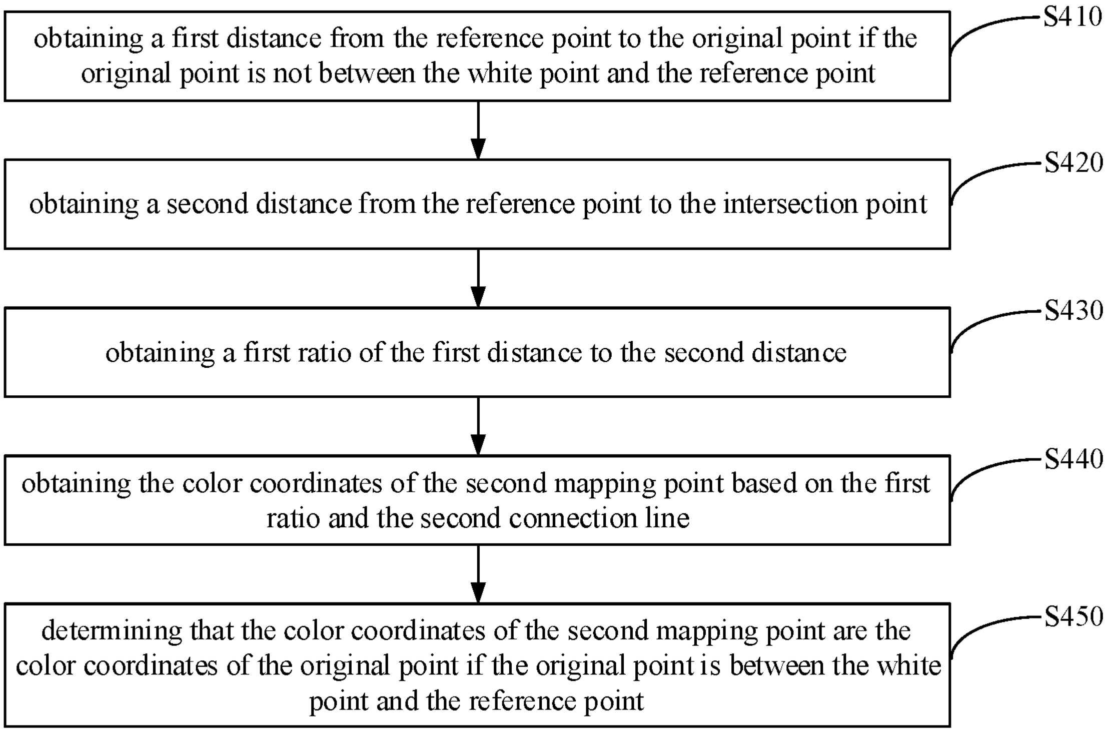
FIG. 7 is a schematic flowchart of a second embodiment of the color gamut mapping method of the present application.

Referring to FIG. 7, FIG. 7 is a schematic flowchart of a second embodiment of the color gamut mapping method of the present application. Based on the first embodiment described above, step S400 comprises:

- step S410: obtaining a first distance from the reference point to the original point if the original point is not between the white point and the reference point;
- step S420: obtaining a second distance from the reference point to the intersection point;
- step S430: obtaining a first ratio of the first distance to the second distance;
- step S440: obtaining the color coordinates of the second mapping point based on the first ratio and the second connection line.

In this embodiment, the color coordinates of the second mapping point of the original point in the target color gamut are obtained based on the position of the original point relative to the white point and the reference point.

If the original point is not between the white point and the reference point, the first distance from the reference point to the original point is obtained, and then the second distance from the reference point to the intersection point is obtained, wherein the first distance and the second distance can be calculated according to the color coordinates of the reference point, the color coordinates of the original point, and the color coordinates of the intersection point, respectively.

A ratio of the first distance to the second distance is the first ratio. The display terminal can obtain the first ratio based on the position of the original point between the reference point and the intersection point, and then can obtain a position of the second mapping point on the second connection line based on the first ratio, and then can obtain the color coordinates of the second mapping point based on the position of the second mapping point on the second connection line.

In one embodiment, the color coordinates of the second mapping point can be obtained from the first ratio and the second connection line by means of an equal-proportional mapping, i.e., a ratio of the distance from the original point to the reference point to the second distance is equal to a ratio of the distance from the second mapping point to the reference point to the length of the second connection line.

In one embodiment, the second connection line may be a distribution curve, and a degree of aggregation may be obtained based on the first ratio, and then the position of the second mapping point on the second connection line may be obtained based on the degree of aggregation, thereby obtaining the color coordinates of the second mapping point.

Step S450: determining that the color coordinates of the second mapping point are the color coordinates of the original point if the original point is between the white point and the reference point.

It should be noted that steps S410 and S450 are parallel to each other and are not performed sequentially, and FIG. 7 is only for ease of understanding and drawing.

If the original point is between the white point and the reference point, the original point to the second mapping point may be an in-situ mapping, then the color coordinates of the second mapping point are the color coordinates of the original point.

In this embodiment, by obtaining the positional relationship between the original point and the white point, the intersection point, and the reference point, the color coordinates of the second mapping point of the original point in the target color gamut are obtained according to the position of the original point on the first connection line, wherein the mapping of the original point to the second mapping point includes in-situ mapping as well as non-linear mapping, and partitioned mapping not only makes mapping relationship simple but also keep the display of the original point in the target color gamut natural and undistorted.

Figure 8:
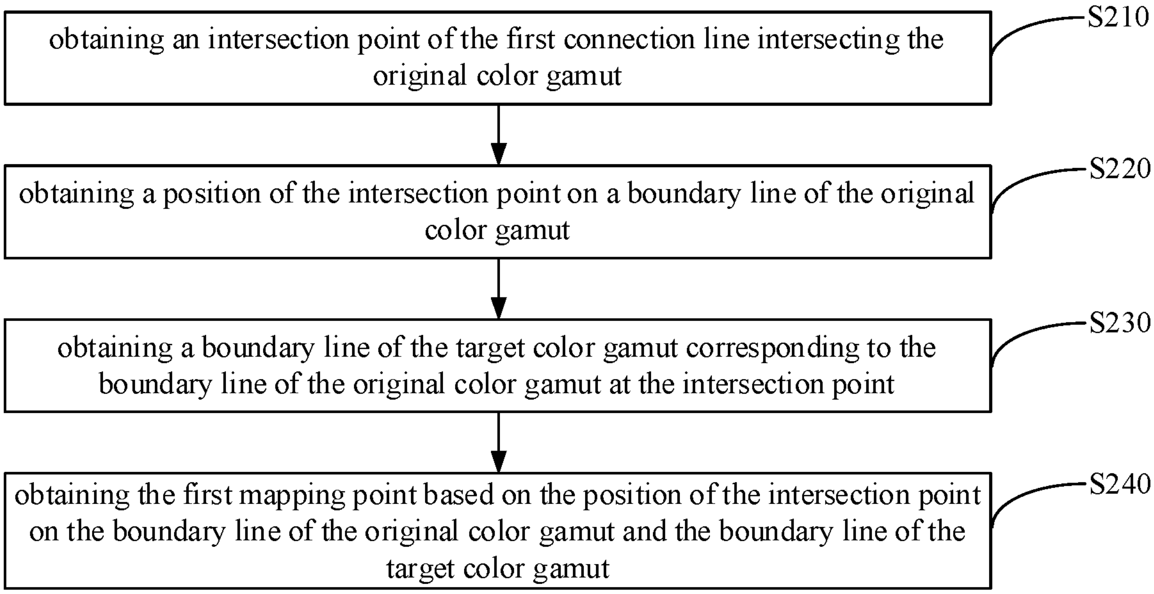
FIG. 8 is a schematic flowchart of a third embodiment of the color gamut mapping method of the present application.

Referring to FIG. 8, FIG. 8 is a schematic flowchart of a third embodiment of the color gamut mapping method of the present application. Based on the first or the second embodiment described above, the step S200 comprises:

- step S210: obtaining an intersection point of the first connection line intersecting the original color gamut;
- step S220: obtaining a position of the intersection point on a boundary line of the original color gamut;
- step S230: obtaining a boundary line of the target color gamut corresponding to the boundary line of the original color gamut at the intersection point;
- step S240: obtaining the first mapping point based on the position of the intersection point on the boundary line of the original color gamut and the boundary line of the target color gamut.

The display terminal obtains the first connection line between the white point and the original point, wherein the first connection line intersects the boundary line of the original color gamut at the intersection point. The display terminal obtains a boundary line corresponding to the target color gamut based on the boundary line of the intersection point in the original color gamut. Referring to FIG. 3, the first connection line OC, OC intersects the boundary line gr of the original color gamut at a point C, and the boundary line gr of the point C in the original color gamut corresponds to the boundary line of the target color gamut as GR.

The display terminal obtains the first mapping point of the intersection point in the target color gamut based on the position of the intersection point on the boundary line of the original color gamut and a corresponding boundary line of the target color gamut. Referring to FIG. 3, according to the position of point C on the line segment gr, a first mapping point D of point C in the target color gamut is obtained, and according to a ratio of a length of line segment Cr to a length of line segment gr equal to a ratio of a length of line segment DR to a length of line segment GR, the first mapping point D can be obtained, and thus, color coordinates of point D can be calculated. Referring to FIG. 4, the first connection line is OA, which intersects the original color gamut at point B. Based on a position of point B in gr, a first mapping point C of point B in the target color gamut can be obtained, and according to a ratio of a length of line segment Br to the length of the line segment gr is equal to a ratio of a length of line segment CR to the length of the line segment GR, the first mapping point C can be obtained, and thus, color coordinates of point C can be calculated.

In this embodiment, by obtaining the intersection point of the first connection line with the original color gamut and the first mapping point of the intersection point in the target color gamut, the position of the first mapping point on the corresponding boundary line of the target color gamut is obtained according to the position of the intersection point on the boundary line of the original color gamut, and the first mapping point of the intersection point in the target color gamut is obtained by equal-proportional mapping. By establishing a connection relationship between the original color gamut and the target color gamut, the original point in the original color gamut is mapped into the target color gamut, which is more in line with characteristics of a color display in the target color gamut, and has a beneficial effect of narrowing a mapping gap between the original color gamut and the target color gamut.

Figure 9:
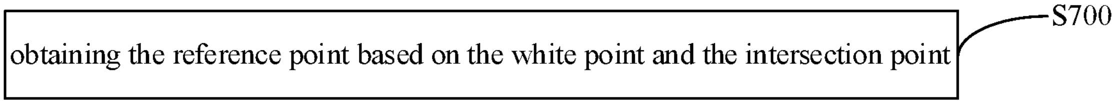
FIG. 9 is a schematic flowchart of a fourth embodiment of the color gamut mapping method of the present application.

Referring to FIG. 9, FIG. 9 is a schematic flowchart of a fourth embodiment of the color gamut mapping method of the present application. Based on any of the first to third embodiments described above, the color gamut mapping method further comprises:

step S700, obtaining the reference point based on the white point and the intersection point.

In this embodiment, the reference point may be set by the designer, and each original point corresponds to a reference point on a connection line between the original point and the white point, and a position of the reference point varies with the original point, but there is only one reference point corresponding to all original points on the connection line between the original point and the white point.

The reference point can be set at any point between the white point and the intersection point, and can be the white point or the intersection point.

Figure 10:
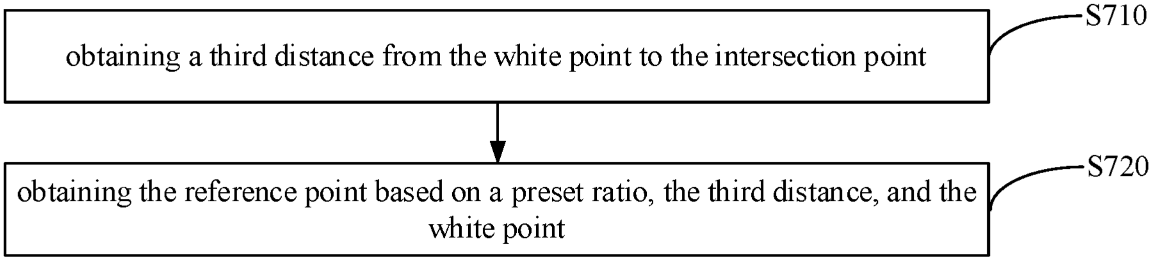
FIG. 10 is a detailed flowchart of step S700 in FIG. 9.

As an optional implementation manner, with reference to FIG. 10, FIG. 10 is a detailed flowchart of step S700 in FIG. 9. The step S700 comprises:

step S710: obtaining a third distance from the white point to the intersection point;

step S720: obtaining the reference point based on a preset ratio, the third distance, and the white point.

The display terminal can obtain the third distance from the white point to the intersection point based on the color coordinates of the white point and the color coordinates of the intersection point.

The preset ratio can be set by the designer and can be adjusted according to actual color display. The preset ratio is greater than or equal to 0 and less than or equal to 1, wherein the preset ratio is equal to a ratio of a distance from the reference point to the white point to the distance from the white point to the intersection point.

The display terminal can obtain the distance from the white point to the reference point based on a product of the preset ratio and the third distance, and then obtain the reference point based on the color coordinates of the white point, which in turn can obtain the color coordinates of the reference point.

In this embodiment, the reference point in the original color gamut is obtained through the white point as well as the intersection point, and the reference point can be adjusted according to the actual display effect of the display terminal to achieve the beneficial effect of a better display effect.

Further, embodiments of the present application provide the color gamut mapping assembly, the color gamut mapping assembly comprising the processor, the memory, and the color gamut mapping program that is stored in the memory and runs on the processor, the color gamut mapping program when executed by the processor implementing the steps of the color gamut mapping method as described above.

Embodiment of the present application further provide the display device, the display device comprises the processor, the memory, and the color gamut mapping program that is stored in the memory and runs on the processor, the color gamut mapping program when executed by the processor implementing the steps of the color gamut mapping method as described above.

Embodiments of the present application further provide the computer-readable storage medium, the computer-readable storage medium having the color gamut mapping program stored thereon, the color gamut mapping program when executed by the processor implementing the steps of the color gamut mapping method as described above.

The embodiments of the present application described above are merely for purposes of illustration and are not intended to distinguish good embodiments from bad embodiments.

It should be noted that the terms "comprising", "including", or any other variations thereof herein are intended to encompass a non-exclusive inclusion, so that a process, method, article, or apparatus that includes a serial of elements includes not only those elements, but also includes other elements not expressly listed, or may also include elements inherent to such process, method, article, or apparatus. In the absence of further limitations, the elements defined by the phrase "including one of" do not preclude the presence of additional identical elements in the process, method, article, or apparatus that includes the elements.

It will be apparent to those skilled in the art from the foregoing description of the implementations that the methods according to the above-described embodiments can be implemented via software plus the necessary general-purpose hardware platform, and certainly can also be implemented by hardware, but in many cases, the former is a better implementation. Based on this understanding, the technical solutions of the present application can be embodied, in essence or as a contribution to the existing technology, in the form of a software product stored in a storage medium (such as ROM/RAM, a magnetic disk, an optical disc), which includes a number of instructions for causing a terminal device (which may be a mobile phone, a computer, a server, air conditioner, or a network device, etc.) to perform the methods described in the various embodiments of the present application.

The above description is merely preferred embodiments of the present application and is not intended to limit the patent scope thereof. Equivalent structures or equivalent flow transformations made with the contents of the present specification and drawings of the present application, which is directly or indirectly applied to other related technical art, are all similarly included within the patent protection scope of the present application.

What is claimed is:

1. A color gamut mapping method, wherein the color gamut mapping method comprises following steps:
 obtaining a first connection line between a white point of an original color gamut and an original point of the original color gamut;
 obtaining a first mapping point in a target color gamut of an intersection point of the first connection line and the original color gamut;
 obtaining a second connection line between a reference point in the original color gamut and the first mapping point;
 obtaining color coordinates of a second mapping point of the original point in the target color gamut according to the white point, the reference point, the original point, the intersection point, and the second connection line;
 obtaining a luminance value of the second mapping point according to the original point and the white point; and
 obtaining grayscale values of the second mapping point according to the color coordinates and the luminance value of the second mapping point.

2. The color gamut mapping method as claimed in claim 1, wherein the step of obtaining the color coordinates of the second mapping point of the original point in the target color gamut according to the white point, the reference point, the original point, the intersection point, and the second connection line comprises:
 obtaining a first distance from the reference point to the original point if the original point is not between the white point and the reference point;
 obtaining a second distance from the reference point to the intersection point;
 obtaining a first ratio of the first distance to the second distance;
 obtaining the color coordinates of the second mapping point based on the first ratio and the second connection line; and
 determining that the color coordinates of the second mapping point are the color coordinates of the original point if the original point is between the white point and the reference point.

3. The color gamut mapping method as claimed in claim 2, wherein the step of obtaining the color coordinates of the second mapping point based on the first ratio and the second connection line comprises: obtaining the color coordinates of the second mapping point through equal-proportional mapping according to the first ratio and the second connection line.

4. The color gamut mapping method as claimed in claim 2, wherein the step of obtaining the color coordinates of the second mapping point based on the first ratio and the second connection line comprises:
 obtaining a degree of aggregation based on the first ratio;
 obtaining a position of the second mapping point on the second connection line according to the degree of aggregation; and
 obtaining the color coordinates of the second mapping point according to the position of the second mapping point on the second connection line, wherein the second connection line is a distribution curve.

5. The color gamut mapping method as claimed in claim 1, wherein the step of obtaining the first mapping point in the target color gamut of the intersection point of the first connection line and the original color gamut comprises:
 obtaining the intersection point of the first connection line intersecting the original color gamut;
 obtaining a position of the intersection point on a boundary line of the original color gamut;
 obtaining a boundary line of the target color gamut corresponding to the boundary line of the original color gamut at the intersection point; and
 obtaining the first mapping point based on the position of the intersection point on the boundary line of the original color gamut and the boundary line of the target color gamut.

6. The color gamut mapping method as claimed in claim 1, wherein the second connection line is a curve, the second connection line is tangent to the first connection line, and the second connection line is tangent to a boundary line of the target color gamut.

7. The color gamut mapping method as claimed in claim 6, wherein the second connection line is an arc curve.

8. The color gamut mapping method as claimed in claim 1, wherein the color gamut mapping method further comprises:
 obtaining the reference point based on the white point and the intersection point.

9. The color gamut mapping method as claimed in claim 8, wherein the step of obtaining the reference point based on the white point and the intersection point comprises:
 obtaining a third distance from the white point to the intersection point;
 obtaining the reference point based on a preset ratio, the third distance, and the white point.

10. The color gamut mapping method as claimed in claim 9, wherein the preset ratio is greater than or equal to 0 and less than or equal to 1, wherein the preset ratio is equal to a ratio of a distance from the reference point to the white point to a distance from the white point to the intersection point.

11. The color gamut mapping method as claimed in claim 1, wherein the step of obtaining the luminance value of the second mapping point according to the original point and the white point comprises:
 obtaining a first maximum luminance value of the white point in the original color gamut and a second maximum luminance value of a white point in the target color gamut;
 obtaining the luminance value of the second mapping point based on a luminance value of the original point, the first maximum luminance value, and the second maximum luminance value.

12. The color gamut mapping method as claimed in claim 11, wherein the step of obtaining the luminance value of the second mapping point based on the luminance value of the original point, the first maximum luminance value, and the second maximum luminance value comprises:
 obtaining a second ratio of the luminance value of the original point to the first maximum luminance value;
 obtaining the luminance value of the second mapping point based on the second ratio and the second maximum luminance value.

13. The color gamut mapping method as claimed in claim 1, wherein the reference point is a non-fixed point or a plurality of non-fixed points preset in the original color gamut.

14. The color gamut mapping method as claimed in claim 1, wherein the white point of the original color gamut is located at a same position in the color coordinates as a white point of the target color gamut.

15. The color gamut mapping method as claimed in claim 2, wherein after the step of determining that the color coordinates of the second mapping point are the color coordinates of the original point if the original point is between the white point and the reference point, the color gamut mapping method further comprises:

adjusting the color coordinates of the second mapping point according to the luminance value of the second mapping point, so that an actual luminance value of the second mapping point is consistent with a calculated luminance value of the second mapping point.

16. The color gamut mapping method as claimed in claim 1, wherein the step of obtaining the grayscale values of the second mapping point according to the color coordinates and the luminance value of the second mapping point comprises:

calculating tri-stimulus values of the second mapping point based on the color coordinates and the luminance value of the second mapping point and an electro-optical conversion curve; and converting the tri-stimulus values of the second mapping point into corresponding grayscale values.

17. The color gamut mapping method as claimed in claim 1, wherein the step of obtaining the grayscale values of the second mapping point according to the color coordinates and the luminance value of the second mapping point comprises:

calculating grayscale values of a plurality of mapping points in a color gamut triangle corresponding to the original color gamut by selecting red, green, and blue (R, G, and B) of the original color gamut at different grayscales, respectively, to establish a mapping lookup table from the original color gamut to the target color gamut; and obtaining the grayscale values of the second mapping point in the target color gamut according to grayscale values of the original point in the original color gamut and the mapping lookup table.

18. A color gamut mapping assembly, wherein the color gamut mapping assembly comprises a processor, a memory, and a color gamut mapping program that is stored in the memory and runs on the processor, the color gamut mapping program implements the steps of the color gamut mapping method as claimed in claim 1 when executed by the processor.

19. A display device, wherein the display device comprises a processor, a memory, and a color gamut mapping program that is stored in the memory and runs on the processor, the color gamut mapping program implements the steps of the color gamut mapping method as claimed in claim 1 when executed by the processor.

20. A computer-readable storage medium, wherein the computer-readable storage medium having a color gamut mapping program stored on the computer-readable storage medium, the color gamut mapping program implements the steps of the color gamut mapping method as claimed in claim 1 when executed by a processor.

* * * * *